W. FRICK,
Assignor to C. H. FRICK.
Coupling and Steering Apparatus.
No. 7,934. Reissued Nov. 6, 1877.
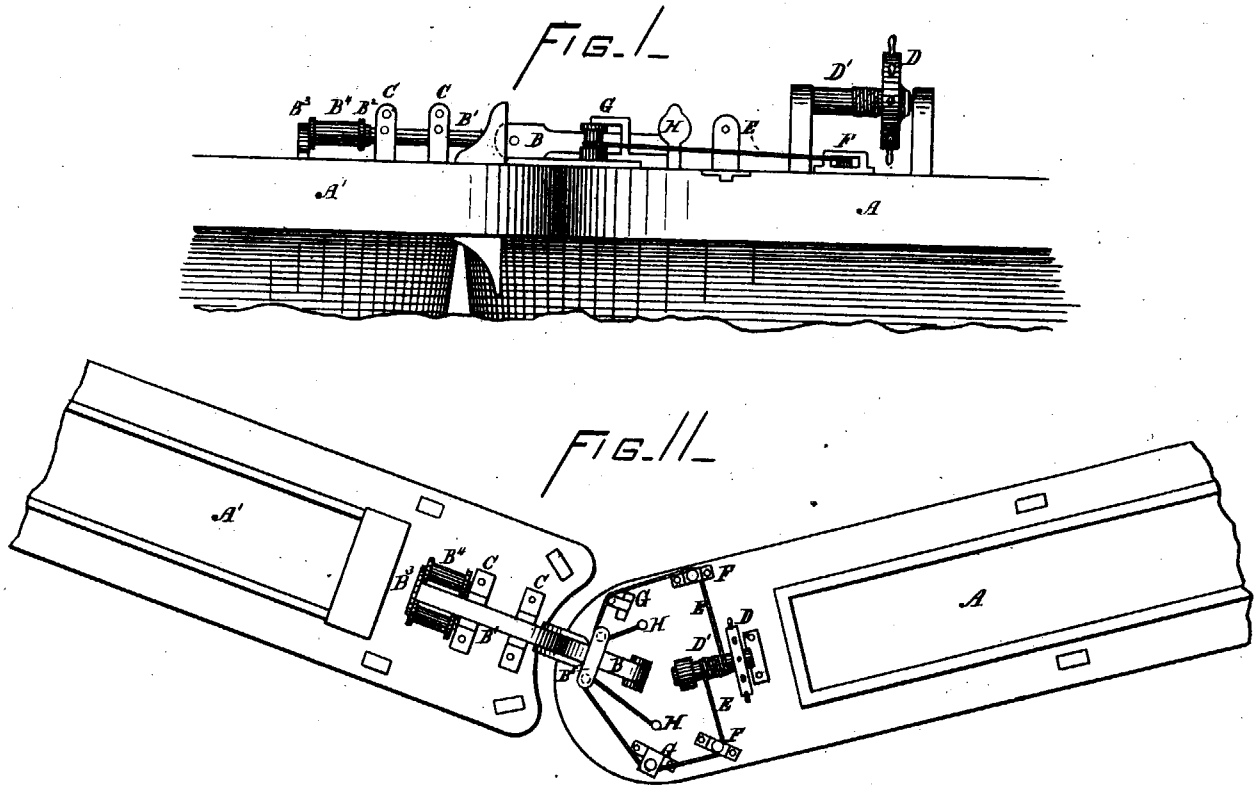
*WITNESSES:*
W. C. Trawbridge.
J. Bonsall Taylor.
*INVENTOR*
William Frick
by George H. Harding
*ATTORNEY*
N. PETERS, PHOTO-LITHOGRAPHER, WASHINGTON, D. C.

UNITED STATES PATENT OFFICE.

WILLIAM FRICK, OF CHESTER, PA., ASSIGNOR TO CHARLES H. FRICK.

IMPROVEMENT IN COUPLING AND STEERING APPARATUS.

Specification forming part of Letters Patent No. 82,614, dated September 29, 1868; Reissue No. 5,000, dated July 23, 1872; Reissue No. 7,934, dated November 6, 1877; application filed April 30, 1877.

*To all whom it may concern:*

Be it known that I, WILLIAM FRICK, of Chester, in the county of Delaware and State of Pennsylvania, have invented a new and useful improvement in the mode of connecting and steering boats arranged to run on canals in train, of which the following is a specification:

This invention relates to an improved mode of connecting and steering boats arranged to run on canals in train, so that heavier freight may be drawn by the same team where the size of the canal, its curvatures, or the capacity of the locks will not permit an increase in the dimensions of the boats.

To this end my invention consists in the combination, in a train of boats, of a flexible connection, which at the same time maintains a space between the boats for the free flow of the current between the stern of one and the bow of the next in series, and a steering mechanism acting from one boat upon the other, so that by the action of the steersman stationed upon one boat the boats in train may be deflected.

My invention further consists in peculiarities of construction of the steering mechanism, to be hereinafter particularly designated.

In the annexed drawing, Figure 1 is an elevation of two boats coupled together, and Fig. 2 a plan of the same.

A A′ are two boats having convex bows and sterns, so as to admit of their being separately navigated. The decks are overhung, but the overhangs are cut away, so that the concavity of one shall fit into the convexity of the other, forming a bearing, upon which the boats, when coupled, may turn one against the other. The boats, when coupled together, should not have their hulls in contact, but have a water-space left between them, as shown in Fig. 1.

The boats, as I have shown them, are connected by a coupling-bar, composed of two pieces, B $B^1$, hinged together. The part B is permanently pivoted to one of the boats, A, and the part $B^1$ is attached to the other boat, A′, by means of the standards C C, which are firmly bolted to the deck thereof, between which the bar $B^1$ is placed, in such manner that while the cross-head $B^2$ bears against one set of the standards, the bar $B^1$, placed between them, shall bear against them all, so that it may act thereon as a lever to turn the boat in the manner to be described.

The bar $B^1$ passes through a slot in the cross-head $B^2$, which slides thereon. The cross-head $B^3$ is rigidly attached to the end of the bar $B^1$, and springs $B^4$ are placed on pins attached to one of the cross-heads and project through holes in the other, so that when in tow the strain on the line may be relieved, in case of sudden jerks, by the compression of the spring. The spring may be of india-rubber, as shown, or spiral, or in any other convenient form. This arrangement is especially necessary when a number of boats are in tow of a tug on wide sheets of water.

The joint in the bar B $B^1$ allows of free vertical oscillation in riding the swells, and, as the bar $B^1$ turns freely on its own axis between the standards, the free rocking of boats from side to side is permitted, while they are perfectly controlled in their relative alignment by the bar.

I have shown in the drawing stern-posts attached to the boat A, for the purpose of attaching thereto a rudder; but this is only a precaution against circumstances which might require the shipping of a rudder.

The boats act one as a rudder for the other, and are controlled in the following manner: D is the wheel, constructed in the ordinary manner of ship's wheels. D′ is the axle, around which is coiled the tiller-rope E, which unwinds on one side as it is wound upon the other. The rope is passed over sheaves F F on each side of the deck, and thence around the sheaves G G, and thence around sheaves in the ends of the arm $B^5$, rigidly attached on each side of the bar B, and then the ends securely fastened to the posts H H. As the wheel is turned in one direction, the rope on that side being wound around the axle D′, the strain of the tiller-rope will be brought to bear on the arm $B^5$ of the bar B, which, acting as a lever whose fulcrum is one boat and the resistance on the other, will cause the two boats to deflect from a right line, the bow of one being inclined to the right and that of the other to the left.

I am aware that boats have been heretofore proposed to be coupled by a flexible connection, serving also to maintain a constant water-space between them, but without means for steering the boats in train, one from another.

I am also aware that means have been heretofore proposed for steering boats in train, one from another; but in such cases no water-space was provided between the boats, and, as a consequence, the difficulties of steering the boats were greatly increased by the current from one setting against the side of the next in series.

I believe myself to be the first to combine the two systems, thereby relieving the intercommunicating steering apparatus from undue strain, and affording the means for conveniently and economically steering boats in train.

What I claim as my invention, and desire to secure by Letters Patent, is—

1. In combination with two boats arranged for the purpose of steering one by the other, an elastic or yielding connection by springs or rubber between the two boats, so that the bow of the rear boat shall be caused to bear upon the center line of the other boat, and at the same time said connection shall be yielding, to prevent the destruction of the connection.

2. Two canal-boats combined and arranged, as described, one to steer the other, and so constructed and arranged that their hulls below the water-line shall not come into contact, substantially as above described.

3. Two canal-boats combined and arranged, as described, for the purpose of steering one by the other, so that the bow of the rear boat and the stern of the front boat shall not be in contact below the water-line; second, so that the center of the bow of the rear boat must be connected with the center of the forward boat at or near its stern, so that the center of the bow of the rear boat may bear against the central line of the stern of the forward boat above the water-line while in the act of steering; and, third, that the connection between the two must be flexible enough to permit of a free vibration and oscillation of the two boats in all directions in reference to each other caused by disturbance in the level of the water.

4. Boats combined with the coupling and steering mechanism, substantially as herein described, whereby the boats are maintained at a fixed distance apart, so as to permit the free flow of the currents between the hulls when turning a curve, and said boats are steered one from another, as set forth.

5. The hinged coupling-bar B $B^1$, when fastened permanently to one boat, and attached to the other by standards C C, in such manner as to permit a free vertical, longitudinal, and lateral oscillation while controlling the alignment of the boats, substantially as set forth.

6. The combination of said hinged coupling-bar, standards, and cross-heads C C, connected by springs $B^4$, arranged to operate substantially as and for the purpose set forth.

7. The combination of the wheel, the tiller-rope, and the hinged bar connecting the two boats, arranged to operate substantially as set forth.

WILLIAM FRICK.

Witnesses:
OWEN DARCY,
JOHN JOLLEY, Jr.